Oct. 10, 1950     C. L. MUZZEY ET AL     2,525,267
BLADE CLASSIFYING APPARATUS

Filed Dec. 6, 1946     6 Sheets-Sheet 1

INVENTORS
Clifford L. Muzzey and Joseph B. Dunn
BY Spencer Hardman & Fehr
their ATTORNEY

Oct. 10, 1950  C. L. MUZZEY ET AL  2,525,267
BLADE CLASSIFYING APPARATUS
Filed Dec. 6, 1946  6 Sheets-Sheet 5

INVENTORS
Clifford L. Muzzey and
Joseph B. Dunn
BY Spencer Hardman Fehr
their ATTORNEYS Oct. 10, 1950     C. L. MUZZEY ET AL     2,525,267
BLADE CLASSIFYING APPARATUS Filed Dec. 6, 1946     6 Sheets-Sheet 6

Patented Oct. 10, 1950

2,525,267

UNITED STATES PATENT OFFICE 2,525,267

BLADE CLASSIFYING APPARATUS

Clifford L. Muzzey, Lexington, Mass., and Joseph B. Dunn, Dayton, Ohio, assignors to General Motors Corporation, Detroit, Mich., a corporation of Delaware Application December 6, 1946, Serial No. 714,382

6 Claims. (Cl. 33—174)

This invention relates to apparatus for determing the relative aerodynamic characteristics of propeller blades particularly for airplane use. Such characteristics depend on the configuration of the blades. Blades having identical configuration will have identical thrust characteristics or properties. In spite of the care that is exercised, blades made by the use of the same shaping devices do not always have the same final configuration. Hence they do not all have the same thrust characteristics. Some may have substantially the same thrust characteristics although they may vary slightly in dimensions from the prescribed dimensions. It is desired that a propeller hub be equipped with blades having substantially the same thrust characteristics as well as being identical as to weight, length, etc. Therefore, it is important to determine the relative thrust properties of the blades that are built for a particular use.

It is an object of the present invention to provide a blade classifying apparatus by which the relative thrust properties may be quickly determined. It is known that the thrust property of a blade section taken at right angles to its root axis is indicated fairly accurately by the angle from a zero mark which indicates a fixed reference line to which the blade is rotated upon its root axis in order to locate the zero lift line of the blade section in a predetermined relation to the fixed reference line. The zero lift line is an imaginary line extending from the trailing tip edge of the section and intersecting the middle point of a line which is at right angles to the zero lift line and which terminates at the blade side surfaces and which is parallel to parallel lines respectively touching the leading and trailing tips of the section and which is half-way between the two lines last mentioned. It is therefore more particularly an object of the invention to provide an apparatus by which the location, in predetermined relation to a fixed reference line, of the zero lift line for various sections or stations of the blade will be accurately indicated when the blade is turned about its root axis for this purpose.

In order to accomplish this, the disclosed embodiment of the invention comprises a table having means for supporting a blade by its root, means for rotating the support so that the blade may be turned about its root axis, a device which encompasses the blade and which can be moved along the table and parallel to the blade axis into as many positions or stations along the blade as necessary and which, at any necessary station, will indicate when the blade has been so angularly adjusted that the zero lift line of the section is parallel to a fixed reference line. In the disclosed embodiment of the invention, the fixed reference line may be considered as being vertical and intersecting the axis of a rotatable chuck which grips the root of the blade. The vertical location of the fixed reference line is represented by a fixed zero mark which serves as an index pointing to graduations on a scale rotating with the chuck to indicate the angle to which the blade is turned about its root axis in order to bring the zero lift line of the blade section into vertical position and therefore parallel to the fixed reference line. The vertical location of the zero lift line of the blade section is indicated when the trailing edge of the blade touches a certain mark on a blade contacting member provided by the device.

The root of the blade is mounted in the chuck in a predetermined angular position as determined by a suitable locating means such as a dowel pin. The blade encompassing device is moved in a direction parallel to the blade root axis to a plurality of predetermined stations. At each station, the chuck is rotated to cause the blade trailing edge to touch the indicating mark of the device. The angle between the chuck index mark and the zero mark on the fixed scale is noted for each station. By means of mathematical tables, the thrust property may be quickly integrated from the angles tabulated. The blade is then marked to indicate its thrust property or characteristic. Blades of the same type or engineering designation and having the same thrust characteristics within certain prescribed close limits will be suitable for assembly with the same propeller hub.

As will be explained hereinafter, the device is so constructed that, when the trailing edge of the blade section touches the indicating mark of the device, the vertical line which intersects the trailing edge is a line which intersects the middle point of a line at right angles thereto, said second line terminating at the blade side surfaces and being half-way between lines parallel thereto and touching the leading and trailing edges of the blade section. The said vertical line is in fact the zero lift line of the blade section and it is parallel to the fixed reference line which is also vertical as stated before.

Further objects and advantages of the present invention will be apparent from the following description, reference being had to the accompanying drawings, wherein a preferred embodiment of the present invention is clearly shown.

Figure 1:
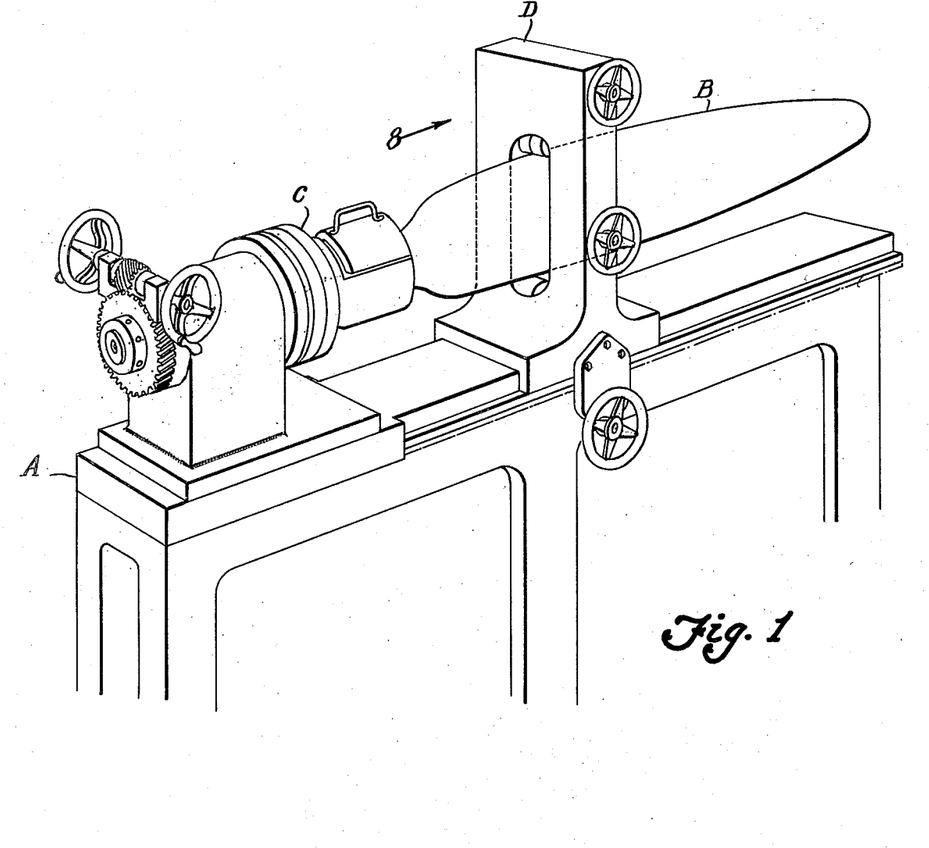
Fig. 1 is a perspective view of the present apparatus.
Figure 2:
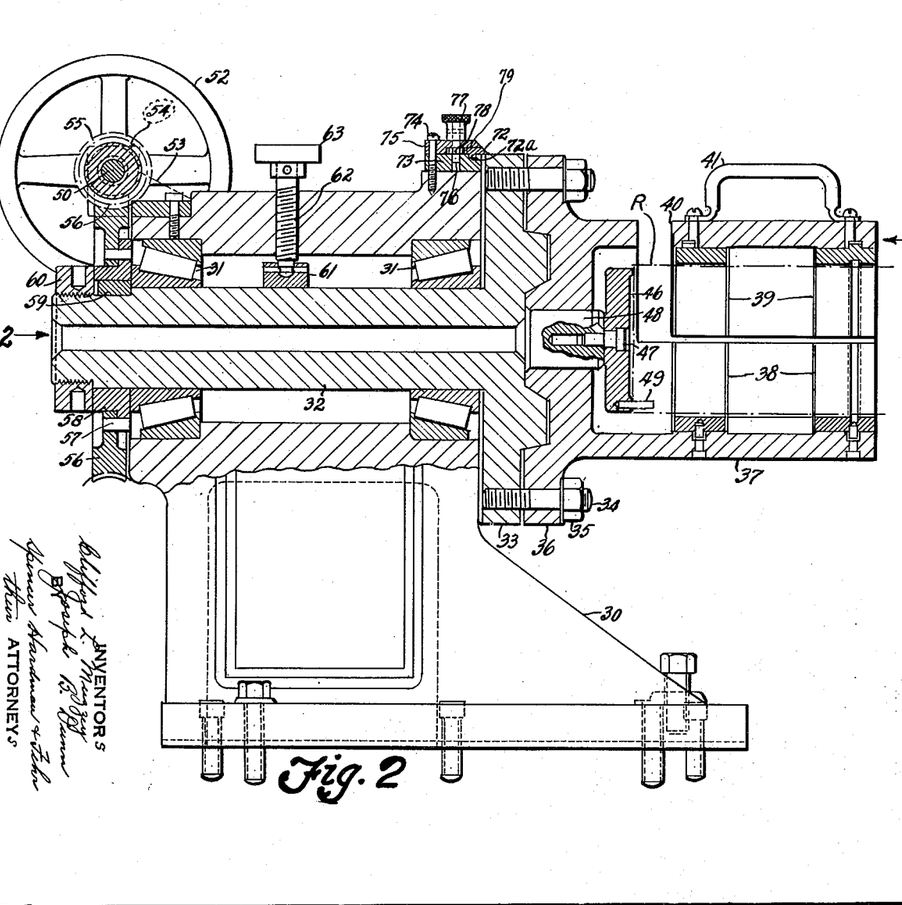
Fig. 2 is a longitudinal sectional view of the blade support on line 2—2 of Fig. 4.
Figure 3:
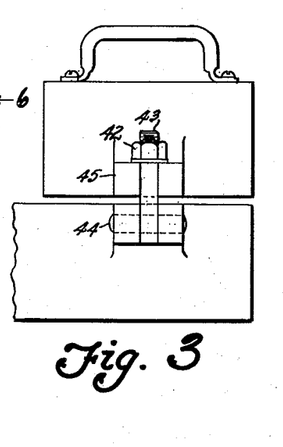
Fig. 3 is a fragmentary side view of the support.
Figure 4:
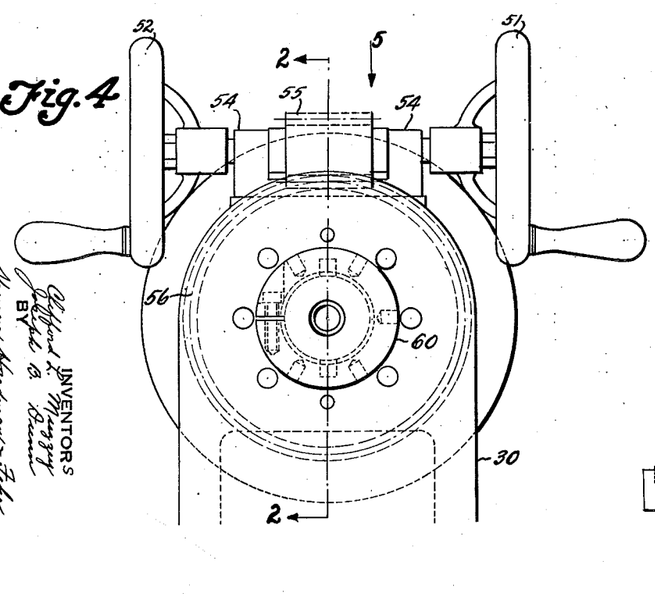
Fig. 4 is an end view in the direction of arrow 4 of Fig. 2.
Figure 5:
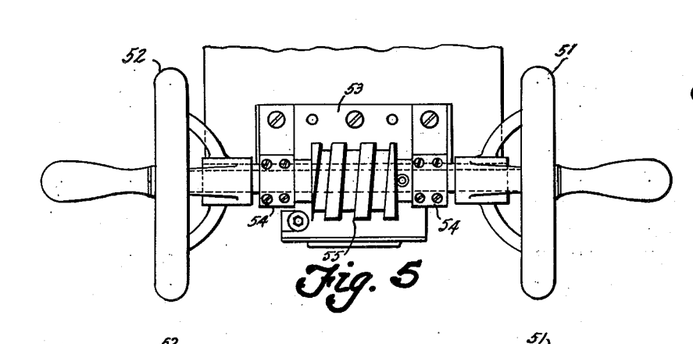
Fig. 5 is a fragmentary top view in the direction of arrow 5 of Fig. 4.

As shown in Fig. 1, the apparatus comprises a table A, a rotatable chuck C which supports a blade B for rotation about its root axis and a geometry-determining device D movable along the table A parallel to the root axis. Fig. 2 shows a frame 30 supporting bearings 31 for a shaft 32 integral with a plate 33 to which studs 34 and nuts 35 attach a plate 36 integral with a chuck lower half-shell 37 which supports liners 38 mating with liners 39 carried by chuck upper half-shell 40 having a handle 41. The liners embrace the blade root and are clamped against it by tightening nuts 42 on eye-bolts 43 pivoted on pins 44, said bolts having been swung into notches of lugs 45 integral with shell 40. The blade root R (fragment shown by dot dash lines) abuts a plate 46 attached by a screw 47 to an insert 48 in plate 36. The dowel pin 49 attached to the blade root R for locating the blade in predetermined relation to the chuck as stated before is received by a hole in plate 46 which bears a certain relation to zero mark on an index scale 71 (Fig. 7) to be described. This same dowel pin 49 is used to locate the blade relative to blade pitch adjusting mechanism as shown in Blanchard et al. Patent No. 2,307,101 granted January 5, 1943.

Shaft 32 is rotated by turning a shaft 50 by either of the hand wheels 51 or 52. Shaft 50 is journalled in bearings provided by a bracket 53 and caps 54, the former being attached to frame 30. Shaft 50 drives a worm 55 meshing with a worm wheel 56 attached by pins 57 to a hub 58 secured by key 59 and by a nut 60 to shaft 33. Inadvertent rotation of the shaft 32 is prevented by a brake shoe 61 engageable with the shaft and forced thereagainst by a screw 62 threaded in the frame 30 and having a hand-knob 63.

Figures 6, 7:
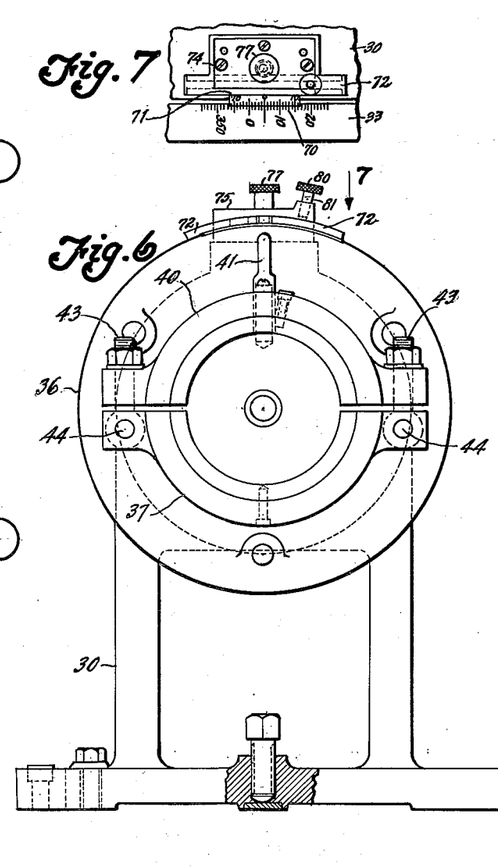
Fig. 6 is an end view in the direction of arrow 6 of Fig. 2.
Fig. 7 is a fragmentary top view in the direction of arrow 7 of Fig. 6.

Fig. 7 shows an an angle scale 70 on plate 33 adjacent an adjustable vernier scale 71 on an arcuate bar 72 having an arcuate rib 72a fitting into an arcuate slot in a plate 73 which screws 74 attach to frame 30 together with a cover plate 75 which retains the bar 72. A shaft 76 having hand-knob 77 is supported by plates 73 and 75 and has a gear 78 meshing with a rack 79 provided by bar 72. By turning the knob 77 the zero mark on scale 71 can be adjusted so that it will be intersected by the reference line which as stated before is a vertical line at right angles to the chuck axis and hence to the blade root axis. Inadvertent turning of knob 77 is prevented by turning knob 80 which carries a screw 81 to engage the bar 72 (Fig. 6).

Device D (Figs. 8 and 9) comprises a relatively fixed frame of parts 100 and 101 secured by screws 103. Parts 100 and 101 enclose and provide a support for a vertically-floating frame structure S (Figs. 17-20) which embraces the the blade B and automatically adapts itself to make contact with the blade. Referring to Figs. 17-20, structure S comprises a U-shaped frame 105 having channels 106 in its longer sides 108 and a channel 107 in its end or yoke 109. Each channel 106 receives and guides a pair of bars 110, 111 having racks 112, 113 respectively meshing with a gear 114. Channel 107 receives and guides a pair of bars 115, 116 provided with racks 117, 118 respectively engaging a gear 119. Bars 111 are integral with a yoke 120 supporting an edge contactor roller 121 which presents a line for contact f—e (Fig. 19) with the blade leading edge. Bars 110 are attached to a yoke 122 having aligned lugs 123 and aligned lugs 124 spaced to provide guides for aligned extensions 125 of a bracket 126 supported by yoke 122 and supporting an edge contactor roller 127 having a center-mark circle 128 whose geometrical center is at the intersection of the axis of a rod 129 (attached to bracket 126) and the axis of roller 127. Axis of roller 127 is parallel to the axis of roller 121. The axis of rod 129 intersects and is perpendicular to the axis of roller 121 as well as the axis of roller 127. All three axes are in the same vertical plane perpendicular to the plane of the top of table A; hence this plane is at right angles to the axis of the blade root.

The trailing edge contactor roller 127 presents a line for contact b—a (Fig. 19) for engagement with the blade trailing edge which, for reasons to be described, is to be located adjacent to a certain point x on line b—a which is indicated by the circle mark 128.

Figures 8, 9:
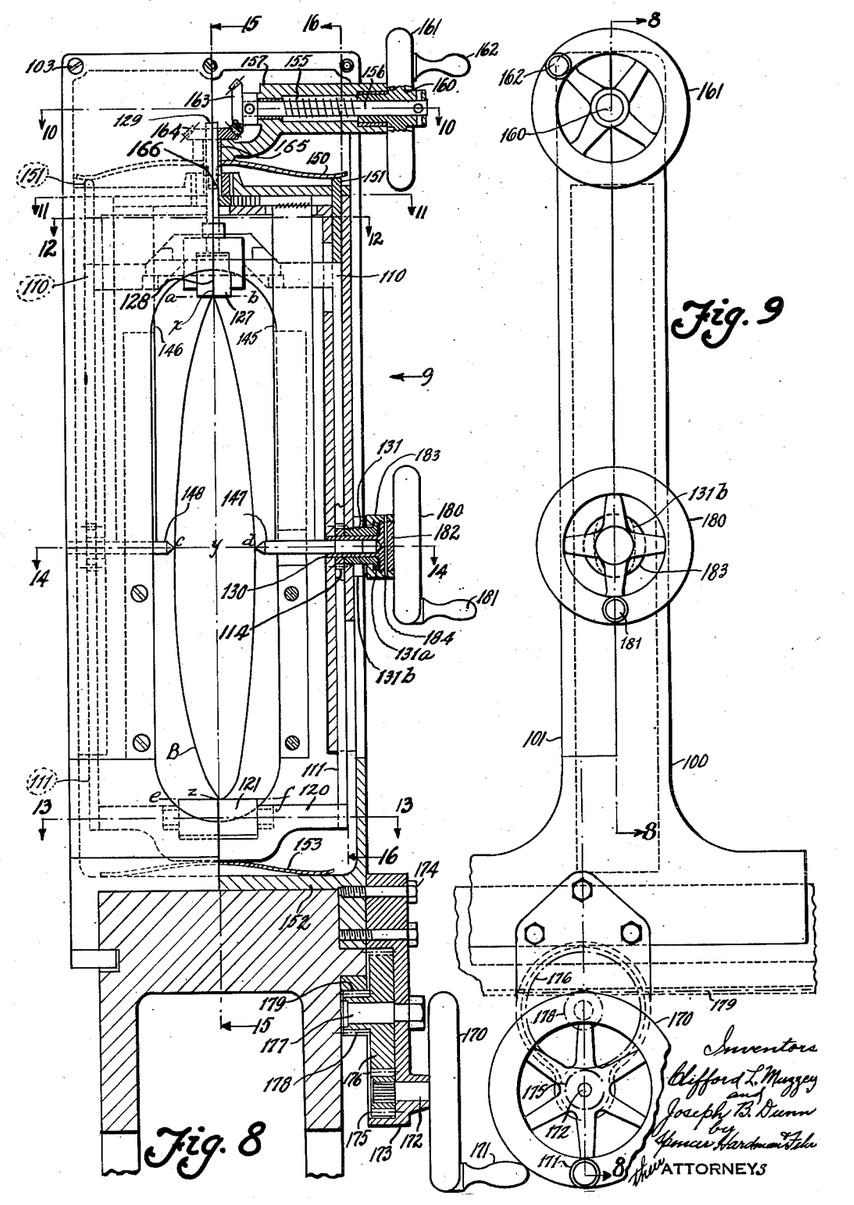
Fig. 8 is a view of the geometry-determining device of the apparatus looking in the direction of arrow 8 of Fig. 1, the part in section being taken on line 8—8 of Fig. 9.
Fig. 9 is a view in the direction of arrow 9 of Fig. 8.
Figure 10:
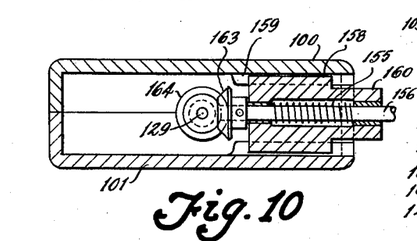
Figs. 10 to 16 are sectional views taken, respectively, on lines 10—10, 11—11, 12—12, 13—13, 14—14, 15—15 and 16—16 of Fig. 8.
Figure 11:
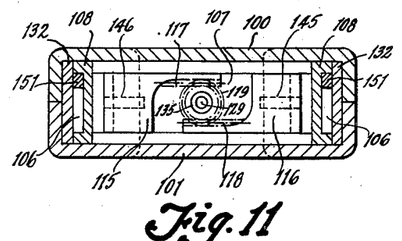
Figure 12:
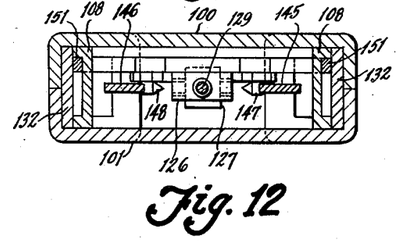
Figure 13:
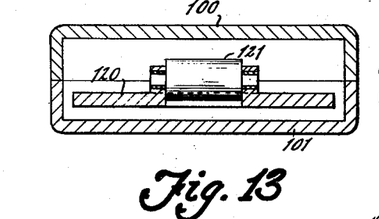
Figures 17, 18, 19, 20:
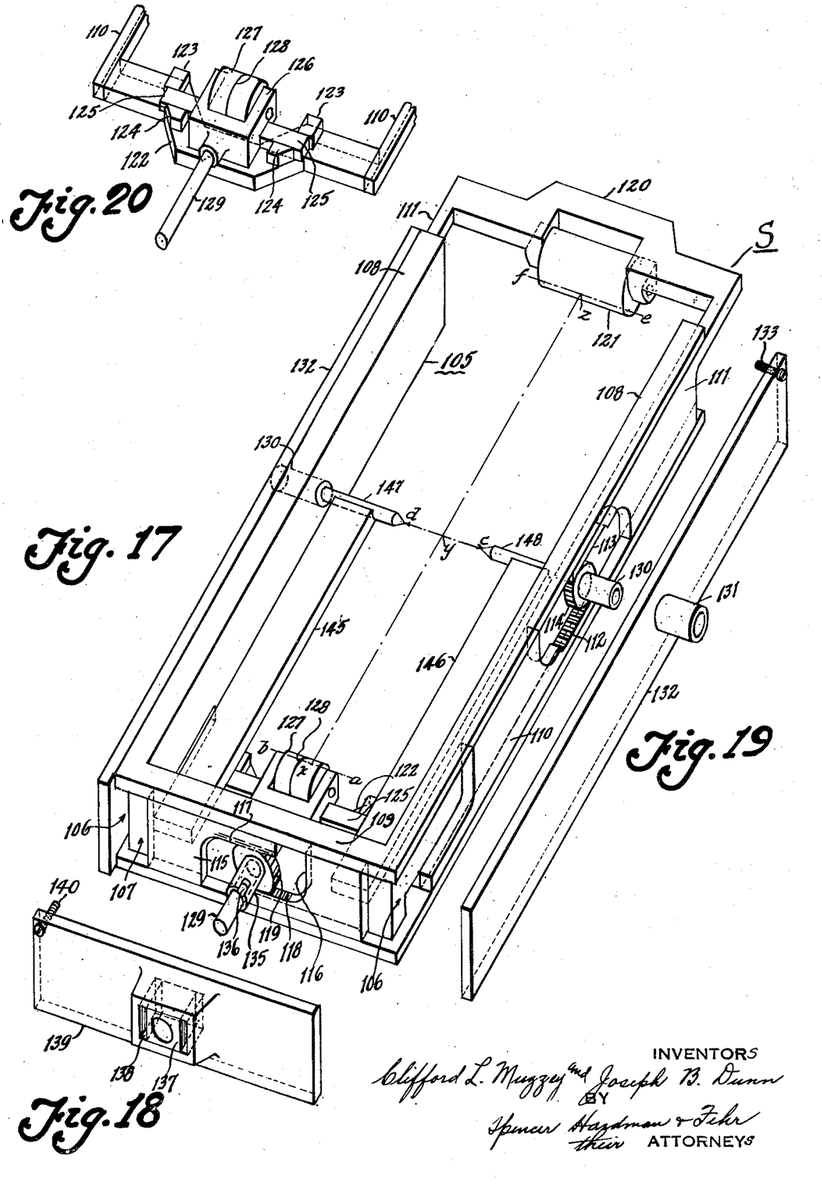
Fig. 17 is a perspective view of an assembly of certain parts enclosed within a relatively fixed housing of geometry-determining device.
Fig. 18 is a perspective view of an end cover of the assembly shown in Fig. 17.
Fig. 19 is a perspective view of a side cover of the assembly shown in Fig. 17.
Fig. 20 is a fragmentary perspective view of certain parts of the assembly which are somewhat hidden in Fig. 17.

When structure S is assembled with frame parts 100 and 101, the roller 127 which is nearest the observer in Fig. 17 is uppermost in Fig. 8. The gears 114 are attached to hub sleeves 130 received by tubular bushings 131 attached to plate 132 which screws 133 attach to frame sides 108. The gear 119 is attached to a hub-sleeve 135 having a notch 136 and journalled on rod 129. Sleeve 135 is received by a bored-block 137 received by an oblong slot 138 provided by cover plate 139 attached to frame end 109 by screws 140. Plate 139 guides block 137 for motion parallel to the motion of rack-bars 115, 116 which moves parallel to the axes of rollers 127 and 121. Rack bars 115, 116 are connected respectively with bars 145, 146 carrying pointed rods 147, 148, respectively, for engaging the side surfaces of blade B. The hubs 130 of gears 114 are journalled respectively on these rods. The rods 147, 148 are always axially aligned, their common axis being parallel to the axes of rollers 127, 121 whose axes are equidistant from the axis of rods 147, 148 when rollers 127, 121 contact the blade edges.

Figure 14:
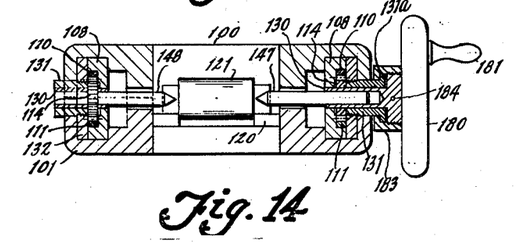
Figures 15, 16:
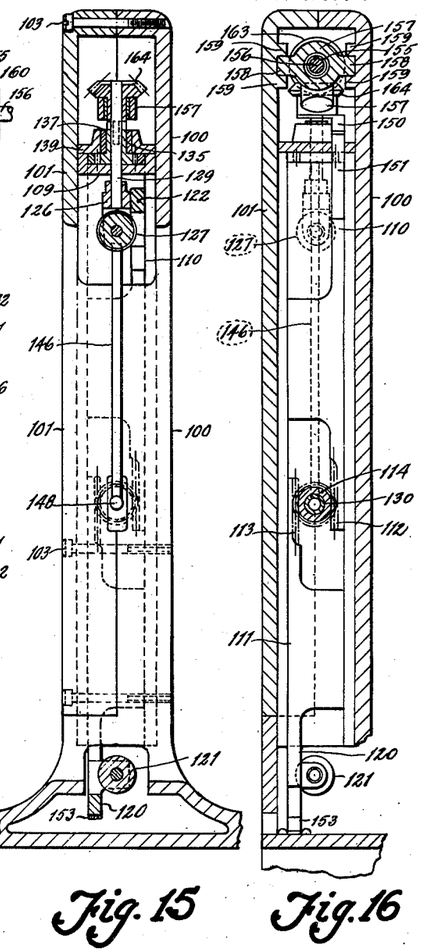

Frame 105 of structure S is guided for vertical movement by frame parts 100, 101 as shown in Figs. 8 and 14. Under a bracket 157 (Fig. 8) fixed against vertical movement, there is located the yoke of a leaf spring 150 whose ends bear against bars 151, which bear against the rack bars 110, which are connected by yoke 122, thereby urging bars 110 and roller 127 downwardly (Fig. 8). Between a wall 152 of frame 100 and yoke 120 connecting bars 111, there is located a leaf spring 153 which urges bars 111 and roller 121 upwardly. Thus rollers 121 and 129 are urged by the leaf springs 153 and 150 toward the blade B. The rods 147 and 148 are spring-urged against blade B by a spring 155 (Fig. 8) coiled around a shaft 156 rotatably supported by a bracket 157 integral with parallel bars 158 guided by lugs 159 provided by frame parts 100 and 101. One end of spring 155 is attached to bracket 157 and the other end to the hub 160 (attached to shaft 156) of a wheel 161 having a handle 162. Shaft 156 is attached to a bevel gear 163 meshing with a bevel gear 164 having a tubular hub 165 mounted on rod 129 and having tongues 166 received by the notches 136 of the hub 135 of gear 119. Spring 155 is biased to operate through gear 119 and racks 117 and 118 to urge the rods 147 and 148 toward the blade B.

The blade B is passed tip-end first through the device D before being attached to the chuck. The minimum distances between the rollers 121 and 127 and between the rods 147 and 148 are such that the tip-end of the blade may pass through the device D without touching either the rollers or the rods. During movement of device D along the table A from right toward left (Fig. 1) from the tip to the section or station nearest the tip, the blade B is engaged by the rollers and rods. Roller 127 may engage the blade in advance of engagement by the roller 121, in which case, spring 153 pushes roller 121 toward the blade and racks 113 move up thereby causing rollers 114 to roll upwardly along racks 112 and come to a position, when roller 121 touches the blade, such that the elements or lines for contact $a$—$b$ and $e$—$f$ of rollers 127 and 121, respectively, which touch the blade are equidistant from the axes of rods 147 and 148. If roller 121 engages the blade in advance of engagement by the roller 127, spring 150 pushes roller 127 toward the blade and racks 112 move down thereby causing rollers 114 to roll upward along racks and come to a position, when roller 127 touches the blade, such that the tangent elements or lines for contact $a$—$b$ and $e$—$f$ of rollers 121 and 127 are equidistant from the axes of rods 147 and 148. In either case there is relative movement between the gears 114 and the frame parts 100 and 101; hence, there is relative movement between the bushings 131 and frame parts 100 and 101 which provide slots 131b to provide for such relative movement of the bushings 131. The floating frame provides for said relative movements. Similarly one of the rods 147, 148 may engage the blade in advance of the other. In such case, the spring 155 operates through shaft 156 and gears 163, 164 and 119 to effect engagement of the other rod with the blade in which event the gear 119 may shift transversely relative to the frame parts 100, 101 in order axially to remain midway between the ends of rods 147 and 148. The rod 129 being positioned by gear 119, and roller 127 being positioned by rod 129, the center-circle-mark 128 on roller 127 is located in a vertical plane midway between the ends $c$ and $d$ of the rods and intersects at point $x$ the line for contact $a$—$b$ of roller 127. Line $c$—$d$ (Fig. 8) is at right angles to the plane of circle-mark 128, point $y$ being at the intersection of $c$—$d$ with said plane and equidistant from $c$ and $d$. Line $c$—$d$ is parallel to the axes of rollers 121 and 127 which are equidistant from $c$—$d$. The elements or lines for contact $a$—$b$ and $e$—$f$ of rollers 127 and 121 respectively, which are touched by the blade are likewise parallel to $c$—$d$ and are equidistant from them, the radii of the rollers being equal.

Therefore it is apparent that the imaginary line $d$—$c$ (Fig. 17) joining the points of contact of the side contactor rods 147, 148 with the blade sides is always in the plane of and midway between the lines for contact $f$—$e$ and $b$—$a$ presented by contactor rollers 121 and 127 respectively, and that the point $x$ on line for contact $b$—$a$ (indicated by circle mark 128) is on a second imaginary line $x$—$z$ extending between the lines for contact $b$—$a$ and $f$—$e$ and bisecting and bisected by line $d$—$c$ at $y$ and at right angles to line $d$—$c$. Line $x$—$z$ is therefore the predetermined location of the zero lift line of the blade section under inspection.

The blade is angularly adjusted so that its trailing edge touches center-circle-mark 128. When the blade is so located, its zero lift line is vertical and is located in a predetermined relation (parallel) with respect to a fixed reference line which is a vertical line intersecting the zero mark on the vernier 71 on bar 72 (Fig. 7), said zero mark remaining fixed after an initial adjustment. Therefore the zero mark represents a reference line intersecting the zero mark and the axis of rotation of the blade. If the zero mark is vertically above the axis of rotation, the reference line is vertical and is therefore parallel to the zero lift line of the blade which has been brought into coincidence with the imaginary vertical line $x$—$z$ (Fig. 17). Therefore scale reading shows the angular relation of the zero lift line of the blade section under inspection with respect to the line of reference which the scale index or zero mark represents. The angular position of the blade is indicated by the division of scale 70 on chuck supporting plate 33 (Fig. 7) which is pointed to by the fixed zero mark on bar 72. This is the angle with respect to the fixed reference line to which the blade is turned about its root axis in order to locate the zero lift line of the blade section under inspection in predetermined (parallel) relation to a fixed reference line. The angle is noted for each blade section or station under inspection.

The device D is moved along the table A in a direction parallel to the blade root axis in order to inspect predetermined sections or stations of the blade. This movement of device D is effected by rotation of a hand wheel 170 (Fig. 8) having a handle 171 and attached to a shaft 172 journaled in a bracket 173 attached by screws 174 to frame part 100. Shaft 172 drives a gear 175 meshing with a gear 176 rotatable around a stub shaft 177 attached to bracket 173. Gear 176 drives a gear 178 meshing with a rack 179 provided by a table A.

Angle readings are made at as many predetermined stations as necessary to arrive by integration at a result which fairly represents the thrust characteristic of the blade. The result may be an angle equal to or greater than or less than an angle which would represent the thrust characteristic of the blade if it had exactly the dimensions designated in the engineering drawings.

Blades are classified according to the amount (in fractions of a degree) of deviation of integrated blade-thrust angle from a standard integrated blade-thrust angle determined by the dimensions designated in the engineering drawings. Blades having the same classification may be assembled together with a hub to provide a satisfactory propeller.

If it is necessary to separate rods 147 and 148 from the blade, the wheel 161 is turned counterclockwise (Fig. 9). For purpose of separating rollers 121 and 127 from the blade, a wheel 180 having a handle 181 is provided. The hub 182 of the wheel 180, which may be integral with the hub 130 of gear 114, is threadedly engaged by a nut 183 having an internal flange for engaging the external flange 131a of the bushing 131 (attached to cover 130) which supports the hub 130. Unscrewing the nut 183 is prevented by a pin 134 passing through the nut 183 and the wheel hub 182. The rollers separate when wheel 180 is turned counterclockwise.

While the embodiment of the present invention as herein disclosed, constitutes a preferred form, it is to be understood that other forms might be adopted, all coming within the scope of the claims which follow.

What is claimed is as follows:

1. Apparatus for use in determining classification of propeller blades by indication of angular position of the blade when the zero lift line of a particular blade cross-section is in a predetermined relation to a certain fixed reference line which intersects and is perpendicular to the root axis of the blade, said apparatus comprising means for supporting the blade for rotation about its root axis, means for rotating the blade to locate the zero lift line of a particular blade cross-section in a predetermined relation to the reference line, means for indicating the angular position of the blade and comprising a scale rotating with the blade and a device providing a scale index or zero mark which the reference line intersects, and a device which determines when the zero lift line of a blade cross-section is in the predetermined relation to the scale index, said device comprising a frame which is movable parallel to the blade root axis to predetermined stations for inspection of predetermined cross-sections of the blade, two edge contactors and two side contactors carried by the frame and movable into engagement with the blade at four points all in the plane of the inspected blade cross-section at right angles to the blade axis, the edge contactors respectively presenting, to the leading and trailing blade edges, lines for contact parallel to each other and lying in said plane, each of the lines for contact containing a point of contact with a blade edge, means guiding the edge contactors for such movement that their lines for contact remain parallel for any blade contacting position of said contactors, means guiding the side contactors into engagement with opposite sides of the blades at points at the ends of an imaginary line parallel to the lines for contact of the edge contactors, means for moving the edge contactors into engagement with the blade, means operating in response to said movement of the edge contactors for so locating the side contactor guiding means that said imaginary line is mid-way between the lines for contact of the edge contactors, means for moving the side contactors into engagement with the blade, means operating in response to said movement of the side contactors for shifting the trailing edge contactor in the direction of its line for contact so that a certain point of its line for contact will be on a second imaginary line which terminates at the lines for contact of the edge contactors and which bisects and is bisected by the first mentioned imaginary line and is at right angles therewith, said certain point being indicated by a reference mark adjacent to which the blade trailing edge is brought by rotation of the blade thereby locating the zero lift line of the blade cross-section under inspection in a predetermined relation to the line of reference intersecting the scale index.

2. Apparatus for use in determining classification of propeller blades by indication of angular position of the blade when the zero lift line of a particular blade cross-section is in a predetermined relation to a certain fixed reference line which intersects and is perpendicular to the root axis of the blade, said apparatus comprising means for supporting the blade for rotation about its root axis, means for rotating the blade to locate the zero lift line of a particular blade cross-section in a predetermined relation to the reference line, means for indicating the angular position of the blade and comprising a scale rotating with the blade and a device providing a scale index or zero mark which the reference line intersects, and a device which determines when the zero lift line of a blade cross-section is in the pretermined relation to the scale index, said device comprising a first frame which is movable parallel to the blade root axis to predetermined stations for inspection of predetermined cross-sections of the blade, two edge contactors and two side contactors carried by the frame and movable into engagement with the blade at four points all in the plane of the inspected blade cross-section at right angles to the blade axis, the edge contactors respectively presenting, to the leading and trailing blade edges, lines for contact parallel to each other and lying in said plane, each of the lines for contact containing a point of contact with a blade edge, a floating frame supported by the first frame and guided thereby for movement in the blade cross-section plane and in a direction at right angles to the lines for contact presented by the edge contactor, edge contactor supports guided by the floating frame for movement such that the lines for contact of the edge contactors are maintained parallel and in the blade cross-section plane, means attached to the floating frame for guiding the side contactors for movement relative to the blade such that their points of contact with the blade sides are at ends of an imaginary line in the blade cross-section plane and parallel to the lines for contact of the edge contactors, means for moving the edge contactors into engagement with the blade edges, means responsive to said movement for so locating the floating frame and the side contactor guides attached thereto that said imaginary line is midway between the lines for contact of the edge contactors, means for moving the side contactors into engagement with the blade sides, means responsive to said movement for shifting the trailing edge contactor in the direction of its line for contact in order to locate a certain point thereof at the end of a second imaginary line connecting the lines for contact of the edge contactors and bisecting and bisected by the first imaginary line and at right angles therewith, said certain point being indicated by a reference mark adjacent to which the blade trailing edge is brought by rotation of the blade thereby locating the zero lift line of the blade cross-section under inspection in a predetermined relation to the line of reference intersecting the scale index.

3. Apparatus for use in determining classification of propeller blades by indication of angular position of the blade when the zero lift line of a particular blade cross-section is in a predetermined relation to a certain fixed reference line which intersects and is perpendicular to the root axis of the blade, said apparatus comprising means for supporting the blade for rotation about its root axis, means for rotating the blade to locate the zero lift line of a particular blade cross-section in a predetermined relation to the reference line, means for indicating the angular position of the blade and comprising a scale rotating with the blade and a device providing a scale index or zero mark which the reference line intersects, and a device which determines when the zero lift line of a blade cross-section is in the predetermined relation to the scale index, said device comprising a first frame which is movable parallel to the blade root axis to predetermined stations for inspection of predetermined cross-sections of the blade, two edge contactors and two side contactors carried by the frame and movable into engagement with the blade at four points all in the plane of the inspected blade cross-section at right angles to the blade axis, the edge contactors respectively presenting, to the leading and trailing blade edges, lines for contact parallel to each other and lying in said plane, each of the lines for contact containing a point of contact with a blade edge, a floating frame supported by the first frame and guided thereby for movement in the blade cross-section plane and in a direction at right angles to the lines for contact presented by the edge contactors, edge contactor supports guided by the floating frame for movement such that the lines for contact of the edge contactors are maintained parallel and in the blade cross-section plane, aligned sleeves attached to the floating frame and respectively guiding the side contactors for movement relative to the blade such that their points of contact with the blade are at the ends of an imaginary line in the blade cross-section plane and parallel to the lines for contact of the edge contactors, gears rotatably supported by the sleeves, edge contactor supports guided by the floating frame for movement such that the lines for contact of the edge contactors are maintained parallel and in the blade cross-section plane, pairs of parallel racks each pair connected to an edge contactor support, one rack of a pair facing the rack of another pair, each group of facing racks meshing with a gear in a manner such as to maintain equal distance between said imaginary line and the lines for contact presented by the edge contactors, means for moving the edge contactors into engagement with the blade edges whereby, in response to said movement of the gears, the sleeves supporting the gears and the floating frame supporting the sleeves move into a position such that said imaginary line is midway between the lines for contact of the edge contactors, means for moving the side contactors into engagement with the blade sides, means responsive to said movement for shifting the trailing edge contactor in the direction of its line for contact in order to locate a certain point thereof at the end of a second imaginary line connecting the lines for contact of the edge contactors and bisecting and bisected by the first imaginary line and at right angles therewith, said certain point being indicated by a reference mark adjacent to which the blade trailing edge is brought by rotation of the blade thereby locating the zero lift line of the blade cross-section under inspection in a predetermined relation to the line of reference intersecting the scale index.

4. Apparatus for use in determining classification of propeller blades by indication of angular position of the blade when the zero lift line of a particular blade cross-section is in a predetermined relation to a certain fixed reference line which intersects and is perpendicular to the root axis of the blade, said apparatus comprising means for supporting the blade for rotation about its root axis, means for rotating the blade to locate the zero lift line of a particular blade cross-section in a predetermined relation to the reference line, means for indicating the angular position of the blade and comprising a scale rotating with the blade and a device providing a scale index or zero mark which the reference line intersects, and a device which determines when the zero lift line of a blade cross-section is in the predetermined relation to the scale index, said device comprising a first frame which is movable parallel to the blade root axis to predetermined stations for inspection of predetermined cross-sections of the blade, two edge contactors and two side contactors carried by the frame and movable into engagement with the blade at four points all in the plane of the inspected blade section at right angles to the blade axis, the edge contactors respectively presenting, to the leading and trailing blade edges, lines for contact parallel to each other and lying in said plane, each of the lines for contact containing a point of contact with a blade edge, a floating frame supported by the first frame and guided thereby for movement in the blade cross-section plane and in a direction at right angles to the lines for contact presented by the edge contactors, edge contactor supports guided by the floating frame for movement such that the lines for contact of the edge contactors are maintained parallel and in the blade cross-section plane, means attached to the floating frame for guiding the side contactors for movement relative to the blade such that their points of contact with the blade sides are at ends of an imaginary line in the blade cross-section plane and parallel to the lines for contact of the edge contactors, means for moving the edge contactors into engagement with the blade edges, means responsive to said movement for so locating the floating frame and the side contactor guides attached thereto that said imaginary line is midway between the lines for contact of the edge contactors, means for moving the side contactors into engagement with the blade sides and including facing parallel racks respectively connected with the side contactors and guided by the floating frame for movement parallel to said imaginary line, a gear meshing with the racks whereby relative movements of the racks are equal and opposite, a floating bearing for the gear supported by the floating frame for lateral movement parallel to said imaginary line, and a device for rotating the gear to cause the side contactors to engage the blade sides, the gear shifting laterally as the side contactors engage the blade, and means actuated by shifting movement of said gear for shifting the trailing edge contactor in the direction of its line for contact in order to locate a certain point thereof at the end of a second imaginary line connecting the lines for contact of the edge contactors and bisecting and bisected by the first imaginary line and at right angles therewith, said certain point being indicated by a reference mark adjacent to which the blade trailing edge is brought by rotation of the blade thereby locating the zero lift line of the blade cross-section under inspection in a predetermined relation to the line of reference intersecting the scale index.

5. Apparatus for use in determining classification of propeller blades by indication of angular position of the blade when the zero lift line of a particular blade cross-section is in a predetermined relation to a certain fixed reference line which intersects and is perpendicular to the root axis of the blade, said apparatus comprising means for supporting the blade for rotation about its root axis, means for rotating the blade to locate the zero lift line of a particular blade cross-section in a predetermined relation to the reference line, means for indicating the angular position of the blade and comprising a scale rotating with the blade and a device providing a scale index or zero mark which the reference line intersects, and a device which determines when the zero lift line of a blade cross-section is in the predetermined relation to the scale index, said device comprising a first frame which is movable parallel to the blade root axis to predetermined stations for inspection of predetermined cross-sections of the blade, two edge contactors and two side contactors carried by the frame and movable into engagement with the blade at four points all in the plane of the inspected blade cross-section at right angles to the blade axis, the edge contactors respectively presenting, to the leading and trailing blade edges, lines for contact parallel to each other and lying in said plane, each of the lines for contact containing a point of contact with a blade edge, a floating frame supported by the first frame and guided thereby for movement in the blade cross-section plane and in a direction at right angles to the lines for contact presented by the edge contactors, edge contactor supports guided by the floating frame for movement such that the lines for contact of the edge contactors are maintained parallel and in the blade cross-section plane, aligned sleeves attached to the floating frame and respectively guiding the side contactors for movement relative to the blade such that their points of contact with the blade are at the ends of an imaginary line in the blade cross-section plane and parallel to the lines for contact of the edge contactors, gears rotatably supported by the sleeves, edge contactor supports guided by the floating frame for movement such that the lines for contact of the edge contactors are maintained parallel and in the blade cross-section plane, pairs of parallel racks each pair connected to an edge contactor support, one rack of a pair facing the rack of another pair, each group of facing racks meshing with a gear in a manner such as to maintain equal distance between said imaginary line and the lines for contact presented by the edge contactors, means for moving the edge contactors into engagement with the blade edge whereby, in response to said movement of the gears, the sleeves supporting the gears and the floating frame supporting the sleeves move into a position such that said imaginary line is midway between the lines for contact of the edge contactors, a floating bracket directly connected with the trailing edge contactor and carried by the trailing edge contactor support and guided thereby for movement such that the line for contact of the trailing edge contact moves longitudinally, means for moving the side contactors into engagement with the blade sides and including facing parallel racks respectively connected with the side contactors and guided by the floating frame for movement parallel to said imaginary line, a gear meshing with the racks whereby relative movements of the racks are equal and opposite, a rod attached to the floating bracket and rotatably supporting the last named gear, a device for rotating said gear to cause the side contactor to engage the blade sides, the rod being shifted laterally by the gear as the side contactors engage the blade, thereby shifting the bracket and the trailing edge contactor in the direction of its line for contact in order to locate a certain point thereof at the end of a second imaginary line connecting the lines for contact of the edge contactors and bisecting and bisected by the first imaginary line and at right angles therewith, said certain point being indicated by a reference mark adjacent to which the blade trailing edge is brought by rotation of the blade thereby locating the zero lift line of the blade cross-section under inspection in a predetermined relation to the line of reference intersected by the scale index.

6. Apparatus for use in determining classification of propeller blades by indication of angular position of the blade when the zero lift line of a particular blade cross-section is in a predetermined relation to a certain fixed reference line which intersects and is perpendicular to the root axis of the blade, said apparatus comprising means for supporting the blade for rotation about its root axis, means for rotating the blade to locate the zero lift line of a particular blade cross-section in a predetermined relation to the reference line, means for indicating the angular position of the blade and comprising a scale rotating with the blade and a device providing a scale index or zero mark which the reference line intersects, and a device which determines when the zero lift line of a blade cross-section is in the predetermined relation to the scale index, said device comprising a first frame which is movable parallel to the blade root axis to predetermined stations for inspection of predetermined sections of the blade, a floating frame supported by the first frame and guided thereby for movement in a plane at right angles to the blade root axis and in a direction having a predetermined relation to the reference line which intersects the scale index, blade edge contactor rollers of the same diameter and respectively engageable with leading and trailing blade edges, supports for the rollers guided by the floating frame for movement in the direction of movement of the floating frame said roller supports maintaining the axes of the rollers parallel and in the plane of the blade cross-section and at right angles to the direction of movement of the roller supports, facing racks extending in the direction of movement of the roller supports and respectively connected therewith, a gear meshing with the racks and supported by the floating frame on an axis in the plane of the roller axes and parallel therewith, aligned guide sleeves attached to the floating frame on an axis midway of the axes of the rollers and in the plane thereof, contact rods slidable in said guide sleeves and having points for engaging the blade sides at points thereof which are the ends of an imaginary line in the plane of the roller axes and parallel thereto and midway between them when the rods and rollers engage the blade, means for moving the roller frames in order to move the rollers against the blade edges, the floating frame shifting relative to the first frame so that the contact rods are on a line midway between the roller axes, means for moving the contact rods into engagement with the blade sides and comprising second facing racks connected respectively with the rods and guided by the floating frame in a direction parallel to said imaginary line, a second gear meshing with the facing racks and guided by the floating frame for edgewise lateral movement in a direction parallel to said imaginary line and a device for turning said gear, said second gear shifting edgewise as the contactor rods engage the sides of the blade, means transmitting the shifting movement of the second gear to the trailing edge contactor roller to cause it to move axially so that a circumferential mark thereon will be at the end of a second imaginary line joining the lines for contact presented by the rollers to the blade edges and located in the plane of the roller and rod axes and at right angles to the first imaginary line which is bisected by and which bisects the second imaginary line, the blade being rotated so that its trailing edge is adjacent to said circumferential mark thereby locating the zero lift line of the blade cross-section under inspection in predetermined relation to the line of reference intersected by the scale index.

CLIFFORD L. MUZZEY.
JOSEPH B. DUNN.

REFERENCES CITED

The following references are of record in the file of this patent:

UNITED STATES PATENTS

| Number | Name | Date |
| --- | --- | --- |
| 2,358,987 | MacKay | Sept. 26, 1944 |
| 2,421,956 | McComb | June 10, 1947 |